(No Model.)
E. S. STIMPSON.
Tool for Setting Temple Teeth.
No. 229,646.    Patented July 6, 1880.
Fig.1.    Fig.2.    Fig.3.
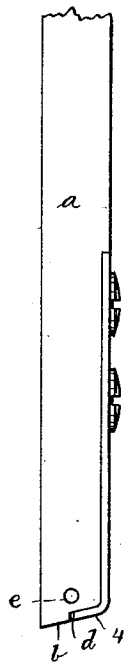 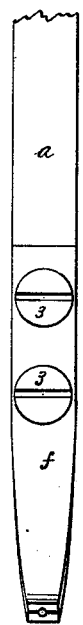 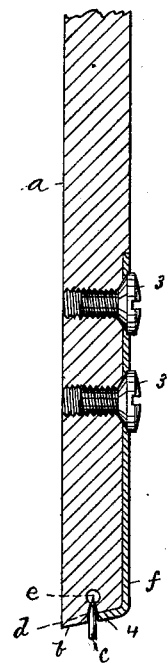
Fig.4.
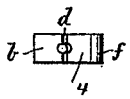
WITNESSES
D. F. Connor
Jos. P. Livermore
INVENTOR
Edward S. Stimpson,
by Crosby & Gregory
Attys
N. PETERS, PHOTO-LITHOGRAPHER, WASHINGTON, D.C.

UNITED STATES PATENT OFFICE.

EDWARD S. STIMPSON, OF HOPEDALE, MASSACHUSETTS, ASSIGNOR TO DUTCHER TEMPLE COMPANY, OF SAME PLACE.

TOOL FOR SETTING TEMPLE-TEETH.

SPECIFICATION forming part of Letters Patent No. 229,646, dated July 6, 1880.

Application filed May 12, 1880. (No model.)

*To all whom it may concern:*

Be it known that I, EDWARD S. STIMPSON, of Hopedale, county of Worcester, State of Massachusetts, have invented an Improvement in Tools for Setting Temple-Teeth, of which the following description, in connection with the accompanying drawings, is a specification.

This invention relates to a tool for setting temple-teeth.

The tool the subject of this application is to be used by hand or otherwise, and is an improvement on the tool described in United States Letters Patent No. 59,984, November 27, 1866, to which reference may be had. In that patent, as in this application, the end of the tool is inclined to rest upon the surface of the temple roller or shell, to control and insure the angular presentation of the tooth to the surface of the roll, and the tool at its end is provided with a tapering hole or socket substantially coincident with the longitudinal axis of the said tool, and at or near the inner end of the said opening a transverse intersecting passage or opening to prevent injury to the sharp point of the tooth to be placed in the said longitudinal passage, to be driven by the said tool, but first into the roller. In that patent the said tool is magnetized, so as to retain the tooth in the said hole as the tooth is being placed in position with relation to the roller to be driven.

To avoid magnetizing a tooth-setting tool of this class and produce a tool easier to manipulate and more certain in its operation under all conditions, I have provided the inclined and perforated end of the tool with a tooth-clamping jaw that serves effectually to hold the tooth when inserted in the said longitudinal passage.

Figure 1 represents, in side elevation, but on an enlarged scale, a tool containing my improvements. Fig. 2 is a view of another end of the tool; Fig. 3, a longitudinal section thereof, a tooth being shown therein, and Fig. 4 a view of the lower end of the tool.

The body *a* of the tool, in practice, will be about three inches long and three-eighths of an inch square.

The lower end or foot of the tool is inclined, as at *b*, to form an inclined rest to bear upon the surface of the temple-roller shell and permit the temple-tooth *c*, (shown in Fig. 3,) and held in the longitudinal opening *d*, made coincident substantially with the longitudinal axis of the said tool, to be driven into the said roller at an inclination to its axis.

To avoid blunting the sharp end of the tooth inserted in the opening *d*, the said opening at its inner end is intersected by a transverse passage or opening, *e*, making an enlarged cavity, in which the sharp point of the tooth rests without liability, or possibility even, of touching the tool.

At one side of this tool I have added the tooth-clamp *f*, it being attached, as herein shown, by the two screws 3 3, and being bent at its lower end, as at 4, to correspond with the beveled or inclined end of the tool, the end of the said clamp in the line of the opening *d* being notched to form one-half the opening or passage leading into the said axial and longitudinal passage *d*.

I claim—

1. A temple-tooth-setting tool provided with an axial or longitudinal passage combined with the clamp, to engage and hold the tooth placed in said axial passage as the tooth is being driven into the temple-roller by the tool, substantially as described.

2. A temple-tooth-setting tool provided at its end with an axial or longitudinal passage and shaped to protect the point of the tooth, combined with the clamp, to engage and hold the tooth placed in the said axial passage as the tooth is being driven into the temple-roller by the said tool, substantially as described.

3. As an improved article of manufacture, the temple-tooth-setting tool herein described, consisting of a rod bored axially and transversely to receive the tooth and beveled or inclined at its end, as described, and a tooth-holding clamp connected therewith to hold the tooth, all substantially as described.

In testimony whereof I have signed my name to this specification in the presence of two subscribing witnesses.

EDWARD S. STIMPSON.

Witnesses:
F. J. DUTCHER,
E. D. BANCROFT.